US008533284B2

(12) United States Patent
Shoemaker et al.

(10) Patent No.: US 8,533,284 B2
(45) Date of Patent: Sep. 10, 2013

(54) SHARING OF MEDIA AND OTHER CONTENT THROUGH A COMMUNICATION CHANNEL

(75) Inventors: Austin Shoemaker, Mountain View, CA (US); Josh Schwarzapel, Palo Alto, CA (US); Kevin Weil, Portola Valley, CA (US); Soujanya Bhumkar, Palo Alto, CA (US)

(73) Assignee: Cooliris, Inc., Palo Alto, CA (US)

( * ) Notice: Subject to any disclaimer, the term of this patent is extended or adjusted under 35 U.S.C. 154(b) by 560 days.

(21) Appl. No.: 12/145,477

(22) Filed: Jun. 24, 2008

(65) Prior Publication Data

US 2009/0300139 A1    Dec. 3, 2009

Related U.S. Application Data

(60) Provisional application No. 61/056,808, filed on May 28, 2008.

(51) Int. Cl.
*G06F 15/16*    (2006.01)
(52) U.S. Cl.
USPC ........... 709/217; 709/204; 709/205; 709/206; 715/751; 715/758
(58) Field of Classification Search
USPC ........................................................ 709/206
See application file for complete search history.

(56) References Cited

U.S. PATENT DOCUMENTS

| 6,549,937 | B1* | 4/2003 | Auerbach et al. ............ 709/206 |
|---|---|---|---|
| 7,124,125 | B2* | 10/2006 | Cook et al. .......................... 1/1 |
| 7,761,507 | B2* | 7/2010 | Herf et al. ..................... 709/204 |
| 2004/0162883 | A1* | 8/2004 | Oreizy et al. ................ 709/207 |
| 2005/0021624 | A1* | 1/2005 | Herf et al. ..................... 709/204 |
| 2005/0060656 | A1* | 3/2005 | Martinez et al. ............. 715/751 |
| 2005/0166139 | A1* | 7/2005 | Pittman et al. ................ 715/511 |
| 2006/0168543 | A1* | 7/2006 | Zaner-Godsey et al. ..... 715/835 |
| 2008/0065501 | A1* | 3/2008 | Stuart et al. ..................... 705/26 |
| 2008/0098301 | A1* | 4/2008 | Black et al. ................... 715/246 |
| 2008/0263137 | A1* | 10/2008 | Pattison et al. .............. 709/203 |
| 2009/0249244 | A1* | 10/2009 | Robinson et al. ............. 715/781 |

* cited by examiner

*Primary Examiner* — Ashok Patel
*Assistant Examiner* — Andrew Goldberg
(74) *Attorney, Agent, or Firm* — Fenwick & West LLP (57) ABSTRACT

Multiple contact lists of a user, which individual lists are maintained in varying formats associated with varying internet-based services or computer-based applications, are federated through the use of an intermediate schema used by a federating messenger application. The federating messenger application may be instantiated as a client resident at a computer system and/or as a server-based application accessible via a Web browser or dedicated client application. In one instance, the federated messenger application includes both client-based and server-based components, and on the client-side may be resident as a browser extension or similar application.

18 Claims, 6 Drawing Sheets

Conversation-Centric View
(separate dialog box)

FIGURE 6A

Conversation-Centric View
(inline dialog box)

FIGURE 6B

Content-Centric View

FIGURE 6C

SHARING OF MEDIA AND OTHER CONTENT THROUGH A COMMUNICATION CHANNEL

RELATED APPLICATION

This application is a NONPROVISIONAL of, claims the priority benefit of and incorporates by reference U.S. Provisional Patent Application 61/056,808, filed 28 May 2008.

FIELD OF THE INVENTION

The present invention relates to methods and systems for federating contact lists of a user to facilitate the sharing of content obtained from web-based sources in a fashion that allows a recipient to experience the content, primarily, but not limited to, digital images and the like, in a fashion similar to that in which the sender thereof experienced.

BACKGROUND

The Internet is a network of networks that can be used as a communication channel for a variety of purposes. One popular means of using this channel is as a vehicle for personal communications, via such means as e-mail, instant messaging, and even audio/video conferencing. These communications tend to be one-to-one, though some forms of one-to-many communications, such as blogs, have gained in popularity in recent years.

The Internet is also used to experience and share media content such as music, photos, and videos. Often this is accomplished through facilities provided by various internet-based services. For example, many services offer on-line photo albums where users can post digital images for viewing by friends or, in some cases, by anyone. Likewise, social networking services offer users the opportunity to connect with others and learn about their hobbies, interests, and perhaps exchange communications with those others. When it comes to sharing content experiences (i.e., the manner in which a particular user discovers, views or otherwise interacts with Internet-based content), however, these channels do not allow a user to effectively communicate his or her personal experiences with recipients of the communications.

For example, if a user discovers certain content at a particular internest site, and wanted to share that content with a friend (or anyone else for that matter), the user would have limited options. The user could perhaps send a link to the site at which the subject images are hosted (allowing the recipients to then visit the site and experience the images in their originally hosted environment), or repost the images as part of the blog (assuming such was permitted by the content owners) and thereby alter (perhaps significantly) the context in which those images were originally displayed. In the former case, while the viewing experience may be preserved (by having the reader visit the original content hosting site), the inconvenience to the recipient is apparent. Said reader would have to leave the messaging environment (e.g., the blog, e-mail, or other communication environment) and visit the hosting site. Even then, the recipient cannot be guaranteed that he/she will have the same experience as the sender of the communication, since the content site may have been modified since the original user's visit. In the latter case, where the content is republished as part of the communication, the recipient is spared the inconvenience of having to leave the communication environment, but the mere act of the republication ensures that the recipient will experience the content quite differently than was the case for the original user. For example, none of the original context of the host site will exist in the communication environment. This may mean that the recipient will fail to appreciate subtleties of the content that would otherwise be apparent were that content to be viewed or experienced in its original context.

Thus, what is needed is a new communication paradigm that allows recipients of a communication to experience the content being communicated in the same manner as a sender of the communication.

SUMMARY OF THE INVENTION

One embodiment of the present invention provides for mapping disparate schemas of a number of distinct internet services to a common schema. Each schema defines references to individual content elements hosted by various ones of the internet services. Communication, using a computer-based application conversant in the common schema, of a first content element from a first one of the internet services to a second one of the internet services is facilitated by translating a reference to the first content element from the common schema into a first schema associated with the first content element, accessing the first content element at the first internet service using a version of the reference compatible with the first schema, and providing the first content element to the second internet service with a content reference compatible with a second schema compatible with the second internet service.

A further embodiment of the invention provides an intermediate aggregation layer communicatively coupled between multiple instances of a messaging application and multiple internet services. Each such instance of the messaging application is associated with an individual computer system. Each internet-based services is associated with a unique application programming interface (API) and data layer. The aggregation layer provides a common schema for references to content objects with which the messaging applications are conversant and translations between the common schema and disparate schemas for references to content objects hosted in the data layers of the different internet-based services.

A further embodiment of the invention provides a contact list accessible by a messaging application associated with an individual computer system. The contact list federates multiple distinct identities of one or more users of different internet-based services, wherein the federated identities of each such user incorporate contact information for each of the respective user's individual identities.

Still a further embodiment of the invention provides a communications system in which any number of communication portals (e.g., personal computer systems, digital media devices, mobile phones, etc.), each having an instance of a messenger client installed thereon, are able to be served (at or about the same time) by a remote server (or servers), thereby permitting users utilizing said messenger clients installed on said portals to directly communicate with one another. In some instances, the communications are facilitated through a user interface that includes windows displayed within the messenger client, the windows representative of communication channels between the various users. The users may be identified by individual, registered email accounts stored on the remote server. In the event a recipient of a message is not presently logged in to his/her account at the remote server, the message may be stored at the server. The message may be passed from the server to the recipient's messenger client when the associated user logs in to his/her account.

The communications between users may encompass, but are not limited to, text, digital images, digital video, and other content. The users may communicate with one another (individually or collectively) using text-based messages (e.g., by providing text information within a window representing a communication channel), or using messages that include images or other forms of content (e.g., by manipulating content items to populate communication windows within the messenger client, thereby providing a link to that content to recipients of the messages). The messenger client environment or a window therein may be closed through an appropriate cursor control event, such a a mouse click of an appropriate screen icon or button, or a keyboard event such as pressing a designated keyboard key (e.g., an <esc> key).

The messenger client may be a portion of a player configured to display digital content items, including but not limited to digital images and digital video, in a graphic, as opposed to textual, form. In one instance, the digital content items are displayed so as to resemble bricks in a wall-like representation of content items. Content items included in messages are displayable within the wall-like representation at a recipient's messenger client and, upon selection from within the wall-like representation may be displayed in a full-screen representation.

Recent correspondence between users connected through the communication channel within the messaging client may be displayed in an unalterable form within one of the windows that represent communication channels. The size of the window may be fixed, and therefore, recently added unalterable text may displace older such text out of the view of the user.

These and other features of the present invention are discussed further below.

BRIEF DESCRIPTION OF THE DRAWINGS

The present invention is illustrated by way of example, and not limitation, in the figures of the accompanying drawings in which.

DETAILED DESCRIPTION

Described herein are methods and systems for federating contact lists of a user to facilitate the sharing of content obtained from web-based sources in a fashion that allows a recipient to experience the content, primarily, but not limited to, digital images and the like, in a fashion similar to that in which the sender thereof experienced. In order to better illustrate the nature of these methods and systems, various embodiments of the present invention will be described below. Although discussed with reference to these specific embodiments, however, the scope of the invention should only be measured by reference to the claims following this description.

In one embodiment of the invention, multiple contact lists of a user, which individual lists are maintained in varying formats associated with varying internet-based services or computer-based applications, are federated through the use of an intermediate schema used by a federating messenger application. The federating messenger application may be instantiated as a client resident at a computer system and/or as a server-based application accessible via a Web browser or dedicated client application. In one instance, the federated messenger application includes both client-based and server-based components, and on the client-side may be resident as a browser extension or similar application.

The federating messenger application facilitates one-to-one or one-to-many communications and provides a layer of abstraction over what may otherwise be multiple application-specific or service-specific contact lists maintained by a user. Despite this level of abstraction, however, the federating messenger application provides a user with information indicative of relationships with contacts of the user so that the user may select appropriate communication channels for sharing messages, content or other information. That is, the federating messenger application permits a sender of a message to choose which "identity" of a contact to communicate with, where that contact may have multiple different identities, each associated with a different social or web-based environment. In this way, personal communications may be passed to a recipient over channels different than those used for professional communications and different than those used for multi-participant/multi-reader communications.

The federating messenger application also serves as a single communication channel through which a user may receive communications from multiple sources. No longer does a user have to visit multiple internet-based services or review multiple information feeds to stay abreast of developments with contacts or others. Instead, the server-based component of the federating messenger application may be used to aggregate information intended for the user and then push that information through the single communications channel on periodic or other schedules. This way, the user need only review a single communication feed in order to receive information from multiple sources.

The client-side portion of the federating messenger application is associated with a user interface that allows viewing of media content within a player running on a personal computer or other computer-based platform. In effect, the player transforms a conventional Web browser into a full-screen three dimensional (3D) experience for viewing images and other digital content. In one embodiment of the invention, this immersive experience is instantiated as a wall of content objects (which may be enhanced to simulate a three-dimensional space through the use of shading, perspectives, etc.), and the user is able to browse the content by dragging, clicking, and zooming (through cursor control actions input via a mouse, track pad, joystick, etc.) around the wall of content objects for an extraordinary viewing experience. As explained in detail below, the player provides a display environment reminiscent of a brick wall, where each brick in the wall is a content object.

Figure 1:
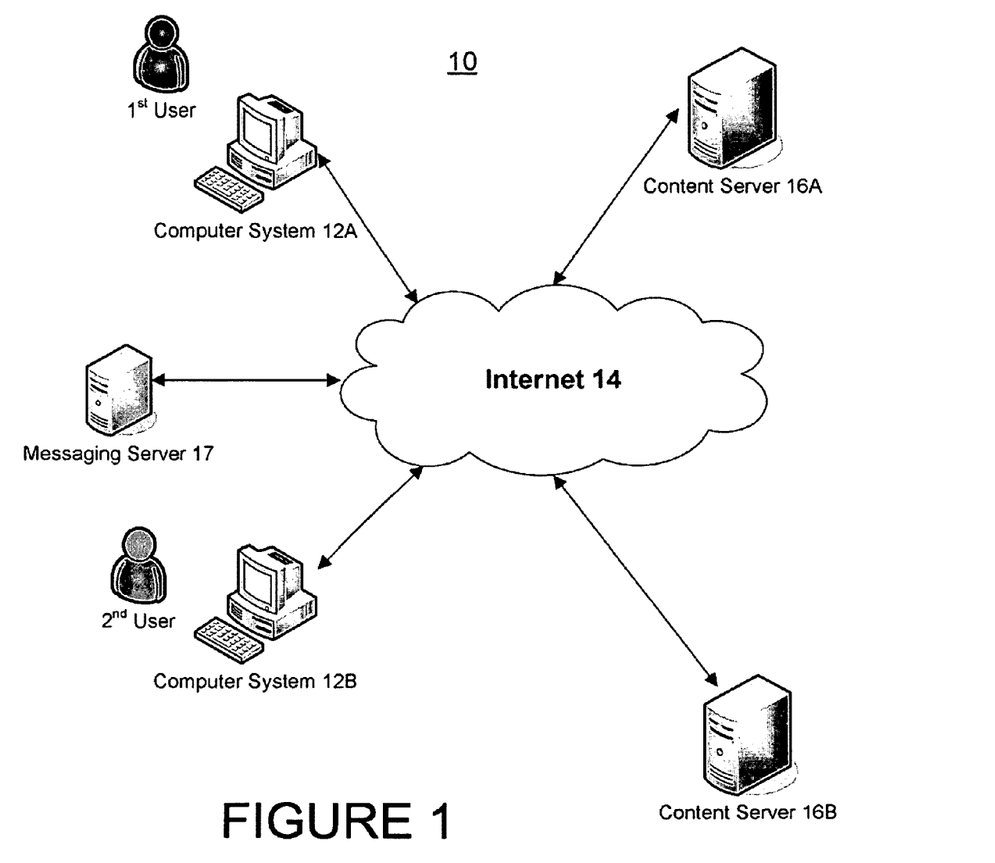
FIG. 1 illustrates an example of a computer network within which embodiments of the present invention may be used.

With the above in mind, we turn first to discussion of the overall environment in which embodiments of the present invention find application. FIG. 1 illustrates a computer network 10 that includes at least two (often many more than two) client computer systems, 1 2A and 12B, each with an associated user. Computer systems 12A and 12B may be any form of computer systems, for example personal computer systems, laptop computers, personal digital assistants, portable digital audio/video players, computer-enabled mobile phones, etc. Instances of the above-mentioned client-side portion of the federated messenger application may be installed at each of computer system 12A and 12B, either as a stand alone application or as an extension to a Web browser or other application. Computer systems 12A and 12B each include means for communicating with other computer systems (e.g., via the Internet 14 or other computer network or networks), although this may be done using wired and/or wireless communications means. Examples of such communications means include conventional Ethernet communication devices and communication devices compatible with IEEE 802.11 a/b/g communication standards. Any other form of inter-computer communication means may likewise be used.

Computer systems 12A and 12B may communicate with any of several remote computer systems, including messaging server 17, content server 16A, and content server 16B. For example, computer systems 12A and 12B may communicate with content servers 16A and 16B to access internet services using a traditional web browser or an internet service-specific client application. As the term is used herein, internet services are services accessible via the World Wide Web (the graphical user interface for the internet), which provide a variety of content and, in some cases, other services to users thereof. Often, these services and content offerings are provided via so-called websites.

There are numerous such websites accessible via the internet, and the types of services offered vary in wide range. Examples of some of the more popular types of services include:
  a) Online communities—services that facilitate social or professional networking among users. Typically, each user will have an associated profile, which includes some form of identity (either real or assumed), and is provided the opportunity to form individual and group-based relationships with other users in order to communicate and share content (e.g., music, videos, and photos) with one another. The networks and sub-networks which develop within these online communities may be organized on the basis of shared interests, occupations, or other affiliations.
  b) Photo sharing—services that offer hosting (storage) and display of digital images. Typically, users are permitted to upload digital images to the service website, where the images can be organized into albums (or other collections) and categories based on event, date, subject, etc. Images can be shared and made accessible for viewing by other users of the service or, possibly, any visitor to the service provider's website.
  c) Video sharing—similar to photo sharing services, video sharing services offer hosting and display of video content. Users are permitted to upload videos to the service website; and the uploaded videos may then be shared among and viewed by others.
  d) Blogs—services that facilitate personalized web pages on which users may publish content of their choosing. Typical content includes commentaries, diary entries, photos, articles, etc.
  e) Chat—services that facilitate peer-to-peer (e.g., user-to-user) online communication in the form of text-based messaging, and in some instances, video conferencing. Chat conversations can be directly between two users or between members of a group, as in a meeting. Some chat services also provide features that allow for the display of presentations or other forms of desktop application sharing.

There can be a considerable overlap of feature offerings between the various types of internet services. For example, online community services tend to integrate some form of photo sharing and blog features into their service offerings as a means of attracting users. Consequently, many users may upload photos to their online community service as well as to their photo sharing service, and each user may choose to store and share such photos on different services or both. In another example, some users may publish commentary on a website associated with a dedicated blog service, while others may do so using blog features within an online community service. In yet, another example, some users may choose to communicate with their contacts through a chat service, while others may choose to do so using conventional email (which itself may be a web-based service).

One significant problem that has arisen as a result of this competition for users is that the formats in which content is stored and referenced within the varying internet services make it extremely difficult for users to share content across these services. That is, users of one internet service cannot, for reasons of technical incompatibilities, readily share content with users of competing internet services. Of course, there do exist software clients that attempt to consolidate partial elements of different internet service accounts. For example, some chat software clients support multiple communication protocols, enabling a user to use a single client across several different services, however, this still does not necessarily allow a user who subscribes exclusively to one chat service to communicate with another user who subscribes exclusively to another chat service. In another example, news feed clients provide a stream of information or previews regarding activity from various internet services (e.g., recently added photos in a photo album, or a recently uploaded video from a contact in an online social community), but users must still access each internet service individually to experience the content in full. Moreover, even where the technical issues can be overcome to permit sharing of content across services, the terms of service of the different internet services often prohibit users from such sharing of content, at least in a direct fashion. As a result, users are forced to maintain multiple different accounts with different internet services in order to ensure that they can maintain relationships with various ones of their contacts.

Needless to say, it becomes extremely burdensome for a user to have to maintain multiple such accounts. Indeed, simple tasks such as accessing an account can become difficult in that an individual user may be forced to remember multiple different online identities. Consider, for example, that each internet service will typically require a user to establish an identity or profile (e.g., in order to sell advertising or other services to the user or simply as a means for gathering contact information for the user), which identity or profile will inevitably include certain credentials that will allow the user to access his/her account at the service. These credentials often include a user name and password (i.e., a secret word or code known only to the user). Having to remember multiple combinations of user names and passwords, one such combination for each internet service the user is subscribed to, can be very difficult, especially if the services require periodic changing of passwords in order to preserve security.

In addition to having to maintain multiple instances of profiles, users of internet services often must maintain multiple instances of contact lists, one per service. Variously referred to as contact lists, friends lists, address books, etc., these "lists" typically include names of contacts (social and/or professional) and some form of contact information (e.g., physical address, phone number(s), email address(es), chat address(es), etc.). In the same way that the different internet services store content in different forms, these services also store contact information in different forms, making it very difficult for a user to apply changes in one list associated with one internet service to other lists associated with other internet services, at least in any automated fashion. Consequently, users are forced to spend significant amounts of time just keeping their individual profiles and contact lists associated with their different subscribed services up to date.

The present invention alleviates many of these difficulties. In accordance with an embodiment of the invention, computer systems 12A and 12B include client-side portions of the above-described federated messenger application, which communicate with a server-side component thereof instantiated at messaging server 17. The messenger application acts as a gateway between computer systems 12A and 12B and internet services hosted at content servers 16A and 16B. For its part, messaging server 17 may host or facilitate access to an internet service that provides federation of a user's contact lists associated with various internet services and may also facilitate content sharing (without requiring content reproduction) among users of computer systems 12A and 12B.

More generally, the federated messenger application facilitates electronic communications between a first end user at computer system 12A and a second end user at computer system 12B via an intermediate computer system (e.g., messaging server 17). Uniquely, the electronic content included in the communication is presented to the second end user in a viewing environment which is the same as that from which the first end user transmitted the communication containing the content. The content may be a digital content element, such as an image, a movie, a web page, etc., and the viewing environment may be described as a metaphorical wall in which the digital content element is displayed as a brick in that metaphorical wall. Alternatively, the viewing environment may be a slideshow-like environment in which the digital content element is presented in a full-screen or near-full-screen manner. The content may also be viewed within the context of a message, inline with a conversation inside a dialog box. Copies of the electronic content may be saved (e.g., at messaging server 17) in a context associated with an account of the first and/or second end user. Thus, the electronic content may be presented to the second end user in the viewing environment along with other digital content shared between the first end user and the second end user.

In some cases, the messenger application may be used to facilitate delivery of an electronic communication that includes a digital content element to a publication medium, rather than to a single (or individually designated) recipients. As indicated, the electronic communication may be initiated by an end user at computer system 12A or 12B and may be destined for an internet service hosted at content server 16A or 16B. The publication medium may be a web-based medium, such as a social network page, a blog, or other medium, accessible by multiple readers. Content servers 16A and 16B may be conventional servers that host media content, such as digital images, movies, email messages, calendars, blogs, etc., and which are each deployed or associated with an internet service (e.g., Facebook™, Flickr™, etc.). In practice, content servers 16A and 16B will be two of many (perhaps tens of thousands of) content servers which messaging server 17 and computer systems 12A and 12B and the messenger applications instantiated thereon will access. Therefore, although only two such content servers are shown in the illustration, readers should be aware that computer systems 12A and 12B may access any of a number of such servers and the websites hosted thereon, as is customary when seeking internet-based content.

Figure 2:
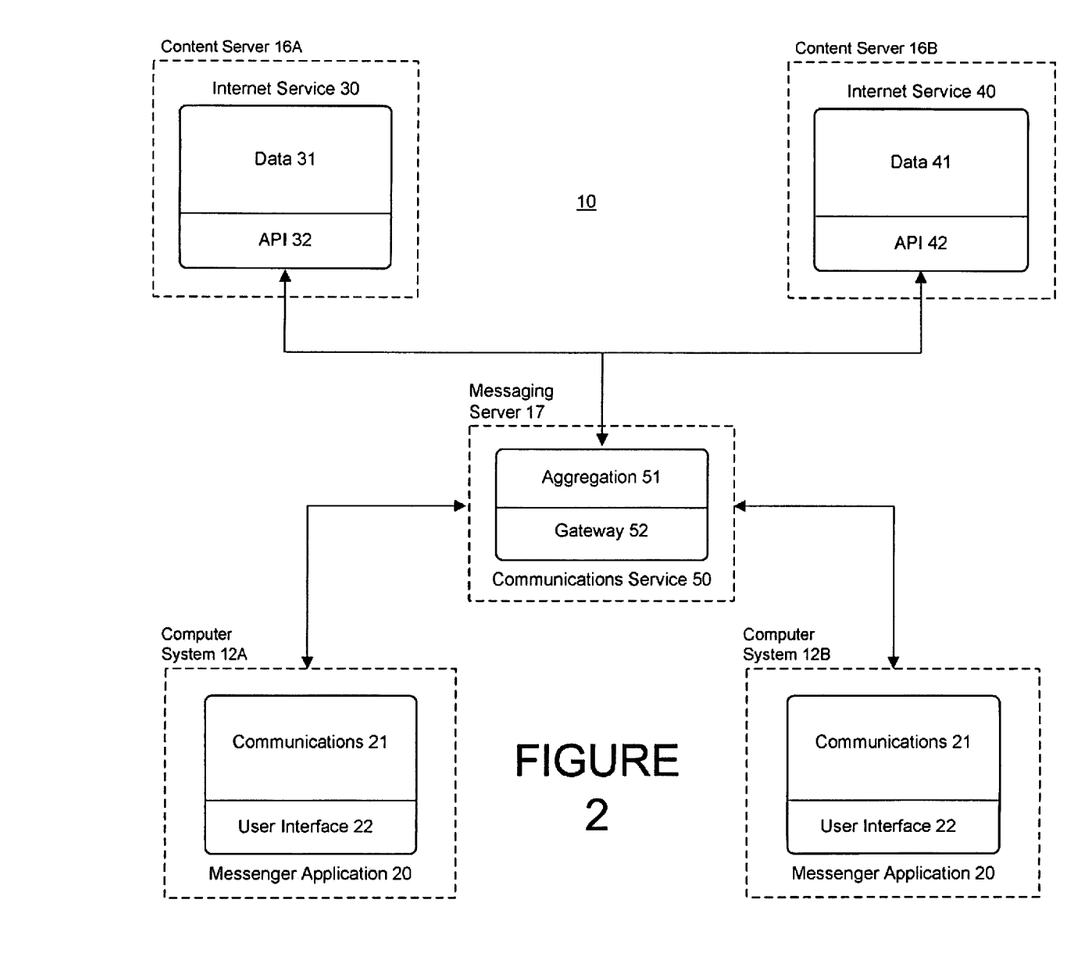
FIG. 2 illustrates examples of partial software architectures for embodiments of the present invention.

The federation services and other nuances of the present messenger application and messaging server are further discussed with reference to FIG. 2, which illustrates a portion of a software architecture for the network shown in FIG. 1. Note, no attempt is made here to illustrate a complete software architecture for such applications and services. Rather, this figure is presented merely to the extent that is relevant to the invention. In this example, instances of a messenger application 20 are installed on computer systems 12A and 12B, and a communications service 50 is installed on messaging server 17. The communications service 50 facilitates inter-messenger application communications as well as the federation of contact lists and content objects discussed below. Content servers 16A and 16B host internet services 30 and 40, respectively, and each internet service stores (or facilitates access to) associated data 31, 41, through a respective application programming interface (API) 32, 42.

The messenger application 20 (which includes a communications layer 21 and a user interface layer 22) serves as a platform or channel through which computer-to-computer communications may be made between users of computer systems 12A and 12B. Messaging server 17 acts as a communications gateway for such messages, allowing the exchange of both text-based communications and references associated with content objects. The content objects themselves, however, reside in the context of their associated internet services, at computer systems 16A and 16B. Hence, the present invention facilitates sharing of content, without actually reproducing the content. This avoids the need for the messaging server to host vast amounts of content and reduces the bandwidth consumed in inter-messenger communications. The present messenger application may, in one embodiment, resemble an instant messenger or chat client. Such applications are well known in the art and permit near-simultaneous communications between users of computer systems.

Figure 3:
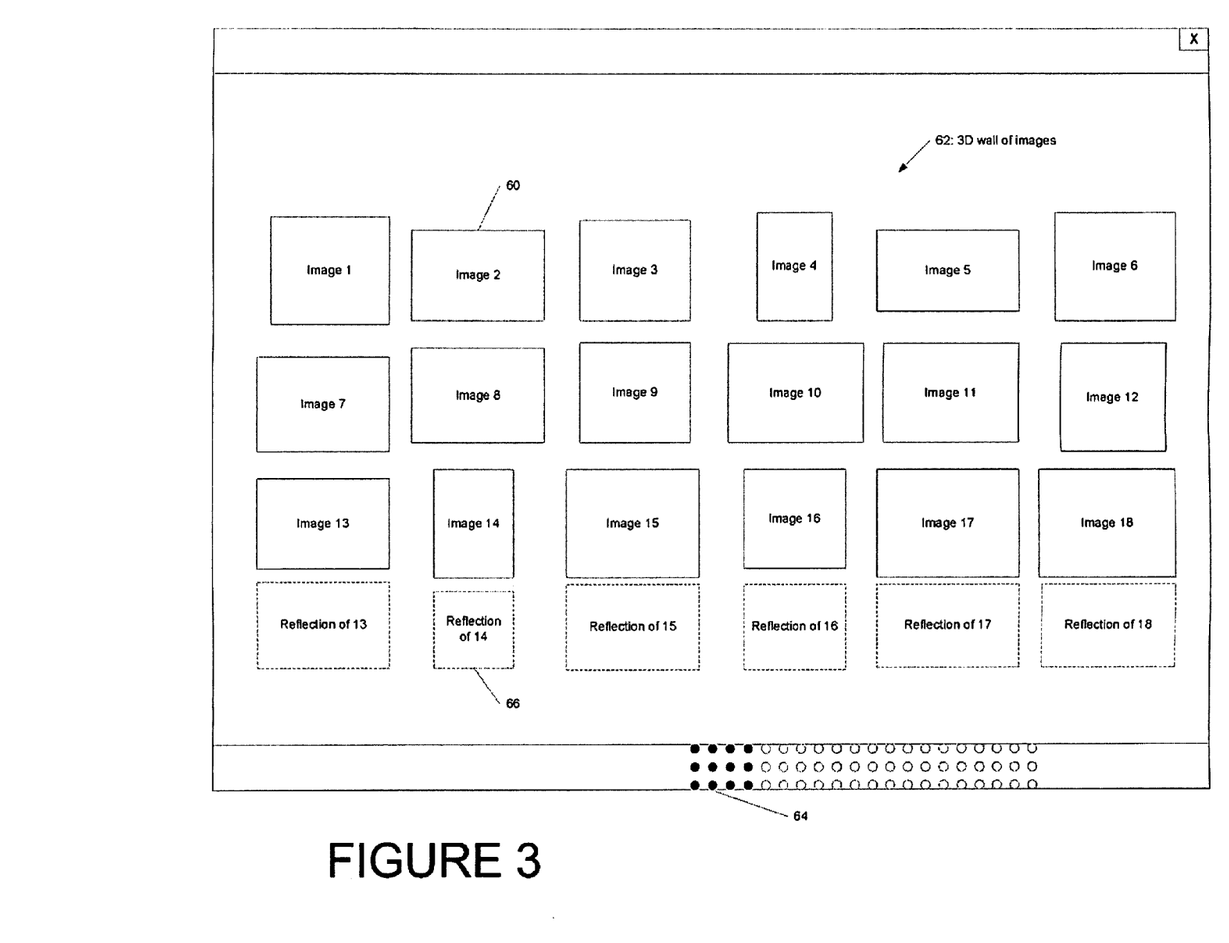
FIG. 3 illustrates an example of a user interface for a content player which includes a messaging application in accordance with an embodiment of the present invention.

As alluded to above, the messenger application 20 also allows for sharing of content in the manner in which it is viewed (or experienced) by the initial reviewer thereof. That is, content viewed by a sending user at computer system 12A can be passed to a receiving user at computer system 12B through the messenger-to-messenger channel and because the content will be viewed by the receiving user through a messenger application similar to that used by the sending user, the receiving user will experience and have the opportunity to interact with the content in much the same fashion as the sending user. In the present invention, the messenger application also features a content player. To facilitate this sharing of user experience, the messenger application 20 may be included in a player instantiated at computer system 12A and 12B. The player, which may be an extension to a Web browser or a stand alone application, is configured to present content elements (such as images and videos from a web site or internet service) in an arrangement that resembles bricks in a metaphorical wall. Such an arrangement is shown in FIG. 3.

In effect, the player transforms a web browser into a full-screen three dimensional (3D) experience for viewing images and other content elements 60. In one embodiment, the immersive experience is instantiated as a wall of images 62 (which may be enhanced to simulate a three-dimensional space through the use of shading, perspectives, etc.), and the user is able to browse the image content by dragging, clicking, and zooming (through cursor control actions input via a mouse, track pad, joystick, etc.) around the wall of images 62 for an extraordinary viewing experience. As illustrated, the player provides an image display environment reminiscent of a brick wall, where each brick in the wall is a thumbnail image 60.

When a traditional web page is viewed through a conventional web browser, users are typically limited to viewing only a few images before having to move to a new web page. The present player eliminates such pagination by prefetching images from the subject website (or displaying images returned in response to a search query) to populate the wall of images 62 so that the user can browse a seemingly endless array of image content from the website being browsed (or the images returned by a search engine in response to a query). A slider or scroll bar 64 at the bottom of the player window gives a visual reference to the user to indicate the user's relative viewing position within the field of images that comprise the wall. In one embodiment, this slider is made to resemble an array of lights and only those lights that correspond to the images being viewed within the player window are highlighted at any one time so as to provided the user with the visual reference as to his/her viewing position within the wall. This works particularly well because the array of lights mimics the arrangement of the images within the wall and, hence, the user is provided with a wall-like, easily understandable representation of his/her viewing position.

While viewing the wall of images 62, the user may navigate by scrolling left or right (e.g., using the slider 64, click and drag mouse operations, keyboard or joystick inputs, track pad operations, or a combination of such techniques, etc.), up or down (e.g., using a click and drag mouse operation, keyboard or joystick inputs, or a track pad operation, etc.), and may also zoom in and out (e.g., using a scroll wheel on a mouse, or keyboard or joystick inputs, etc.). This ability to zoom in and out gives the wall of images 62 a three dimensional feel. Further, when scrolling left or right, the wall of images may be canted (i.e. to simulate rotation about a vertical axis) to give the user the impression of flying past the wall of images. That is, the wall of images may be displayed so as to give the effect of vanishing off to one side of the viewer's display screen or the other, much like a large wall would appear to a person standing beside it. This adds to the three-dimensional nature of the viewing experience. Likewise, by providing simulated reflections 66 of images on the bottom row of the wall, the three dimensional feel of the viewing experience is enhanced. Further details regarding the immersive viewing experience may be found in the above-cited provisional patent application.

Figure 4A:
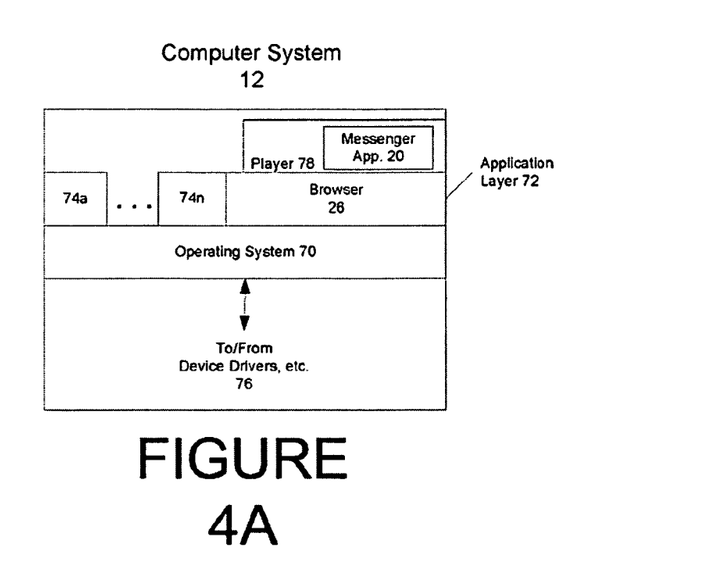
FIGS. 4A and 4B illustrate examples of partial software architectures for embodiments of the present invention.
Figure 4B:
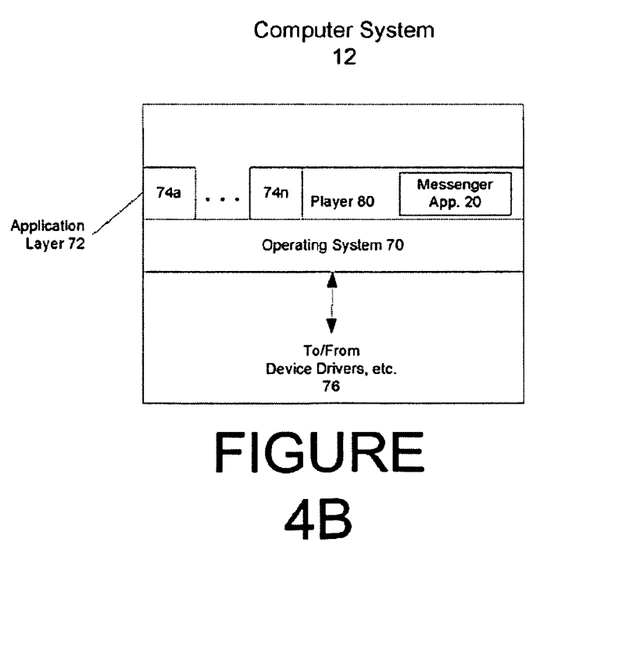

FIGS. 4A and 4B illustrate alternative software architectures for computer systems 12A and 12B (collectively referred to as computer system 12 in connection with this illustration). Note, no attempt is made here to illustrate a complete software architecture for such a system. Rather, these figures are presented merely to illustrate two variations on how the above-mentioned player may be installed in such a system. With this purpose in mind, FIG. 2A shows one example where computer system 12 includes an operating system 70, on which sits an application software layer 72. Several application programs 74a-74n may be installed, one of which may be a conventional browser application 76. In such a configuration, the player 78 may be installed as an extension or plug-in to browser 76. Alternatively, as shown in FIG. 4B, a player 80 may be installed as a stand-alone application program. A separate browser may still be part of computer system 12 in this configuration, however, the player 80 need not make use of that browser as a supporting platform. In each case, the operating system 70 communicates with the computer hardware via various device drivers and communication protocol stacks 76, which are not shown in detail so as not to unnecessarily complicate the figures.

Returning to FIG. 2, recall that each of the internet services 30, 40, have an associated data layer 31, 41, accessible through a respective API 32, 42. Data layers 31, 41 each contain data specific to internet services 30 and 40, respectively. API layers 32, 42 are specific to internet services 30 and 40, respectively. APIs are interfaces that provide a vehicle through which requests for data or services can be made by applications running on computer systems. In the present context, APIs 32 and 42 permit accesses to data layers 31 and 41, respectively, for requests by computer systems 12A and 12B. For simplicity of discussion, it will be assumed that data layers 31 and 32 include contact lists or other forms of address books for users of the internet services 30 and 40, respectively, although in some instances these contact lists, etc., may be maintained in other formats. In such instances, the APIs 32 and 42 would be the gateways through which accesses to those contact lists would be facilitated.

The specific programming details of the data layers 31, 41 and APIs 32, 42 are not critical to the present invention, however, it should be understood that in general the manner and formats in which individual data objects are stored and/or referenced in the respective data layers and the format for calls and other operations made via the respective APIs are not the same. For example, data layers 3 1, 41 may include data objects such as log-in credentials, personal contact information, photos, videos, calendars, contact lists, emails, blogs, music, etc. specific to internet services 30, 40, respectively. Such data from one internet service may be disparate in varying degrees with data from another internet service. As examples of such disparities, consider the following. The data objects in a chat service are essentially conversations, while the data objects in a photo album service are essentially digital images (though metadata associated with the images may also be included and may, in some cases, resemble a conversation where threaded comments are permitted). The contact list or group of friends that a user has in a particular online community service may be different from the group of friends that the same user has in another online community service. The screen name or identity of a user for a particular chat service may be different from that used by the same user in connections with another service. The data format for address books or contact lists on a particular internet service may be different from that on another service. Even where the data object itself is stored in a common format across internet services (e.g., many internet services will store digital images as .jpg images), the encoding scheme for metadata associated with that object or the reference to that object that indicates its storage location will be quite different. By metadata is meant contextual or other information about, regarding or associated with a data object. For example, a digital image may be associated with information concerning the time and place where image was captured, the identity of the people or subject matter shown in the image, the purpose of the image, details regarding camera settings used to capture the image, etc.

Likewise, the APIs 32, 42 for internet services 30, 40 are typically quite different. This layer of each internet service may provide a different interface between itself and the applications that it interacts with. For example, a particular chat service may have an API suited for its own client application, which is different from the API of another chat service. Online community services, photo album services, blog services, etc. may all have varying APIs. Some client applications such as web browsers are able to interact with the different APIs of all (or nearly all) web-based services, often with the assistance of helper applications known as extensions or plug-ins. A web browser is thus analogous to a multilingual person who can converse with several people, each of whom can only speak a single language. The multilingual person can only have a direct conversation with one such individual at a time. The multilingual person cannot have a group conversation, nor can he/she speak with more than one person simultaneously, since the various individuals cannot understand more than one language. Similarly, a user must use a separate instance of a web browser for interacting with each internet service. For example, a user using three internet services with disparate APIs must open three different web browser windows or tabs, where each such instance of the web browser signifies a separate one-to-one conversation between the user and the respective internet service.

Such disparities pose varying degrees of inconvenience in using and sharing content in an integrated fashion. Consider the following examples. A photo from a photo album service cannot be conveniently dragged and dropped into a chat conversation dialog box due to the disparate APIs of the chat and photo services. A less than convenient way to insert the photo would be for the user to manually insert a hypertext link into the chat window so that the recipient may select the link in order to view the photo outside of the chat conversation. In a further example, a member of a particular online community service may wish to share a photo from within the community with someone from another online community service. The disparity of communities may prevent the photo from being shared conveniently. In another example, a user's contact lists or address books associated with a particular internet service may not be conveniently imported from or exported to another internet service's address book.

To address these problems, messaging server 17 hosts a communication service 50, which includes an aggregation layer 51 and a gateway layer 52. Aggregation layer 51 serves as an intermediary to facilitate communication between disparate APIs and, by extension, different internet services. In one example, this intermediate service maps disparate elements of internet services 30 and 40 into a common schema, which is understood by the messaging applications 20 instantiated at \ computer systems 12A and 12B. In effect, APIs 32 and 42 are abstracted into a single common API in aggregation layer 51. Thus, incompatibilities between internet service 30 and internet service 40 are eliminated.

By providing a single abstraction layer through which different internet services may be contacted, users need no longer launch multiple instances of a web browser application in order to make use of those services. Rather than several one-to-one interactions between the web browser and the different internet services, the messenger application 20 may have one-to-many interactions with multiple internet services. Carrying further the previous analogy, each of the people who speak a different language is taught a common intermediate language by the multilingual person. Accordingly, the multilingual person may now have one conversation together with the entire group of speakers, and more importantly he/she may also facilitate conversation between each of them.

Within the common schema provided by aggregation layer 51, uniform references or pointers to content elements hosted in data layers 31, 41 of disparate internet services 30, 40 are formulated so as to reference the content objects in an internet service-independent manner. In other words, the specific representations of data objects (i.e., photos, videos, contact lists, calendars, blogs, etc.) are decoupled from their respective internet services and reformulated into a uniform indexing plan. This provides a uniform method for referencing content from different internet services and also provides a translation table so that an object referenced in one schema can be identified in another schema. Accordingly, this enables users to freely manipulate references to content from disparate internet services so that the content may be collectively organized, viewed, and experienced in the common environment of the player in which the present messenger application exists.

One type of reference or pointer often used by internet services for directing web browsers to content is known as a Uniform Resource Locator (URL). However, this is a uniform indexing scheme that merely enables a web browser to access content from internet services through the service's respective APIs. The level of manipulation that can be applied to such a content reference is very limited. Due to the restrictive nature of URLs, sharing and organizing content across internet services can be very cumbersome and limited.

For example, in order to share such a reference a sending user must type (or copy and paste using appropriate cursor control actions) a URL of a content element into a message dialog box and send same to a receiving user. The receiving user must then copy and paste this URL into his/her web browser to access the content. Alternatively, additional syntax may be combined with the URL to create a hypertext link, which when selected (e.g., using a mouse click or similar action) automatically causes a web browser to launch and attempt to access the content. Most client applications provided by internet chat services automate this step in the sending process, where if a sending user enters a URL in the dialog box, sending the message will automatically attach the necessary syntax so that the receiving user will receive a selectable link. However the receiving user must still manually select the link in order to view the content.

A further limitation of the URL indexing scheme is that often times a URL is not a direct reference to the content. Such is the case with popular video upload and sharing services, which have a layer of indirection in the URLs associated with video content elements. For example a URL of a video content element may actually point to a time-expiring intermediate reference, which then points to the actual video file on the video content server.

Redefining references in a more flexible, consistent, and service/API-independent indexing scheme consistent with the present invention allows the references to be manipulated in a fashion such that content can be conveniently shared and organized. For example, a user may directly drag and drop a digital image hosted at his/her online photo album service (or even from his/her personal computer storage) into a calendar object associated with his/her calendar service. Because the calendar object and the digital image are each identified in a service-independent fashion in the common schema provided by the aggregation service 51, the messaging server 17 is able to identify the associated objects, perform any necessary translations in order to identify the objects in the schemas of their native environments, access the content objects from those native environments using the native environment identifiers, and then perform the user-designated actions by manipulating the content objects in the prescribed manner. Of course, this assumes that the respective internet services permit the content object manipulations being attempted (some internet services do not allow content objects to be moved or copied from their website).

In another example, a digital image hosted at a particular photo album service may be dragged and dropped in an album hosted at another photo album service or an album hosted at an online community service. Again, this is made possible by the messaging server 17 being able to identify the associated objects based on the common intermediate schema representations provided by the messenger application through which the user action is communicated, perform any necessary translations in order to identify the designated content objects in the schemas of their native environments, access the content objects from those native environments using the native environment identifiers, and then perform the user-designated actions by manipulating the content objects in the prescribed manner. By redefining the references to content from disparate internet services into a common intermediate system, users are permitted to manage and control the content references in such a way as if the actual content itself existed collectively in the common environment.

Figure 5:
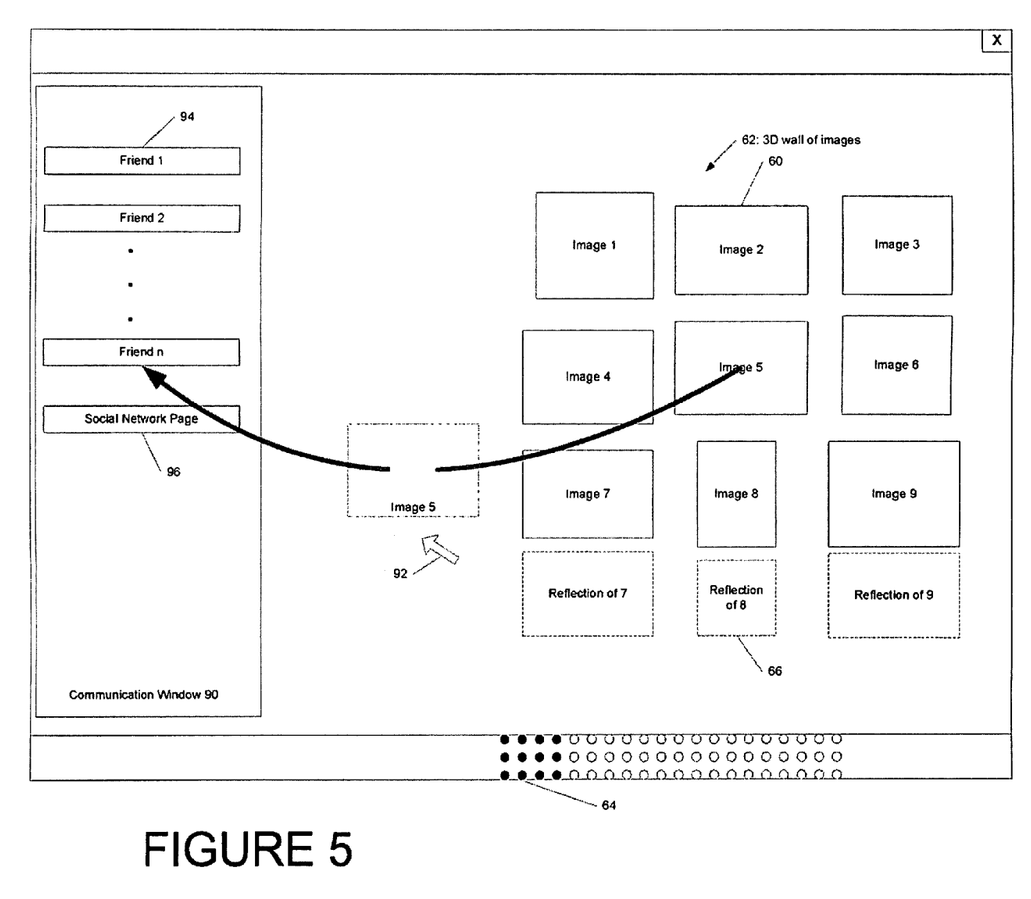
FIG. 5 illustrates an example of an area within which communication or messaging channels may be provided within the context of a wall of images in accordance with an embodiment of the present invention.

Manipulation of the content object references within the format of the common intermediate schema also allows for references to content viewed by a sending user at computer system 12A to be passed to a receiving user at computer system 12B through a messenger-to-messenger communication channel that includes communications layer 21 and messaging server 17. This transmission of content references within a message may be done using a drag and drop operation, as shown in FIG. 5.

Assume that a first user at computer system 12A has been viewing content displayed within a wall-like presentation within the user's player. Now, if the first user wishes to share one of the images he/she is viewing with a friend who uses computer system 12B, the first user can invoke the communications layer 21 within the messenger application 20 at computer system 12A to so share that content (i.e., a reference thereto). Once the communications means is active, then in response to moving the cursor 92 over a designated part of the screen, a communication window 90 may be opened within the player (note, although FIG. 5 shows a communications window open within the wall-like content view, a similar communications window may be displayed as a separate window superimposed over the wall-like content view). In one embodiment of the invention, the communications window is allowed to slide in and out of the left-most edge of the player window in response to cursor position. That way, when not in use the window is out of sight and does not interfere with the viewing experience. Other implementations are of course possible and this is only one example.

The communications window 90 includes icons or other objects 94 that are labeled with the names of the user's contacts (e.g., which may be obtained from an electronic address book as discussed below). These icons 94 act as reference points for a user to drag and drop images (or other content) from the wall of images. For example, shown in the illustration is a user dragging and dropping (using cursor 92) a copy of an image onto the icon associated with "Friend n". In response to the drag and drop operation, a dialog box (not shown in this view) may open. The dialog box may include a text box in which the user can enter a brief message to "Friend n" (e.g., an explanation of the image and why the user is sending it or any other comment the user wishes to make) and means for sending the message and the attached image (e.g., a SEND button may be included in the dialog box).

The image (and any accompanying message) may be sent in a variety of ways. For example, these materials could be sent as an attachment to an email. The friend's email address may be obtained from an electronic address book, an email message to that address formatted and the image and message attached and sent accordingly (e.g., using an existing e-mail client at computer system 12). However, as discussed above, in a preferred implementation the message is passed via the messaging server 17 (or another server) in an instant message-like fashion so that it arrives at computer system 12B and allows "Friend n" to open the message and view the image in the context of a wall of images (perhaps including previous content shared between the friends). That is, when the recipient opens the message or otherwise interacts with the image contained therein, the player will be launched at computer system 12B and the received image will be presented within the player (i.e., in the same environment as the sending user experienced it). This way, the recipient of the message can experience the content in the same manner as the sender thereof.

If the recipient of the message is not presently viewing content within his/her player, he/she may receive a message that such content is waiting. For example, an alert may be presented by way of instant message, email, or other fashion. In some cases, an alert may be posted at a page of a social networking site maintained by the recipient. Such alerts may be managed via the gateway 52 of communications service 50 at messaging server 17.

In addition to facilitating one-to-one communications between friends, the present invention includes a one-to-many communication channel. Notice that icon 96 is designated as a social network page. This is meant to indicate that the user can publish content directly from the player to his/her social network page (e.g., a personal profile, blog, wall of content, etc.) using a similar drag and drop operation as is used to transmit messages to friends. The reference to the content will be passed from the player at the user's computer system to the messaging server 17 (or another server) and the messaging server is able to identify the associated object, perform any necessary translations in order to identify the object in the schemas of its native environment, access the content object from that native environment using the native environment identifier, and then perform the user-designated action by uploading the content object to the user's social network page (as would be indicated in the user's account details at server 17), assuming such action is permitted by the internet service hosting the original content object. Such a publication channel allows an individual user to share content he/she finds interesting with a large number of visitors to the user's social network page.

In various embodiments of the invention, multiple images or content objects may be dragged onto a stack before actual transmission of a message. For example, a user may select and drag several images onto a stack, and then drag and drop the stack onto the icon associated with a particular friend. More images may also be added individually or in a stack by dragging and dropping the image or stack into the existing dialog box.

Additional friends may also be included in the same conversation to view the shared content. This is achieved by the user dragging and dropping additional icons 94 into the dialog box. A user may simply drag the icons of the particular friends whom he/she would like to include into tie existing dialog box.

The messenger application may include a time stamp with any messages. Copies of communications may be time stamped and stored in chronological threads at messaging server 17, for example in the context of a particular user's account (see below) and/or may be stored on a particular user's computer system. Thus, an individual user may preserve a copy of his/her discussions with other users. Further, content shared between such users may be preserved in the context of a user's account (e.g., either or both of the sender's and/or recipient's account). A user can select a particular thread to review by selecting the desired thread from a list of stored threads. The thread may be presented to the user in either a conversation-centric view (see, e.g., FIGS. 6A and 6B) or a content-centric view (see, e.g., FIG. 6C).

Figure 6A:
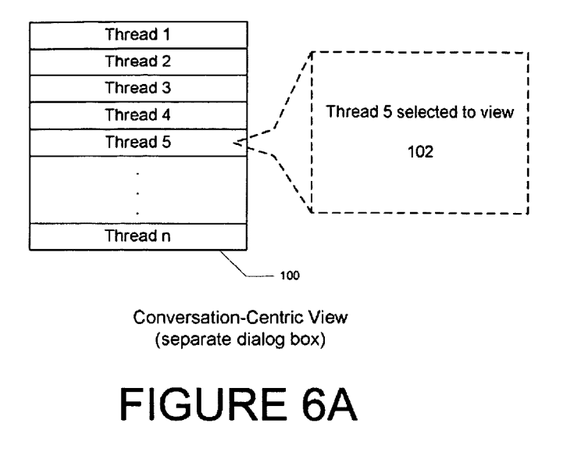
FIGS. 6A-6C illustrate examples of presentation formats for threaded communications in accordance with embodiments of the present invention.
Figure 6B:
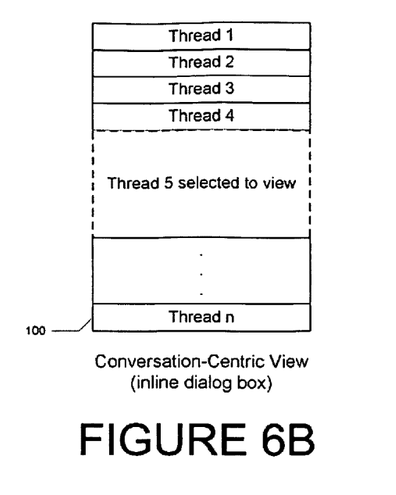
Figure 6C:
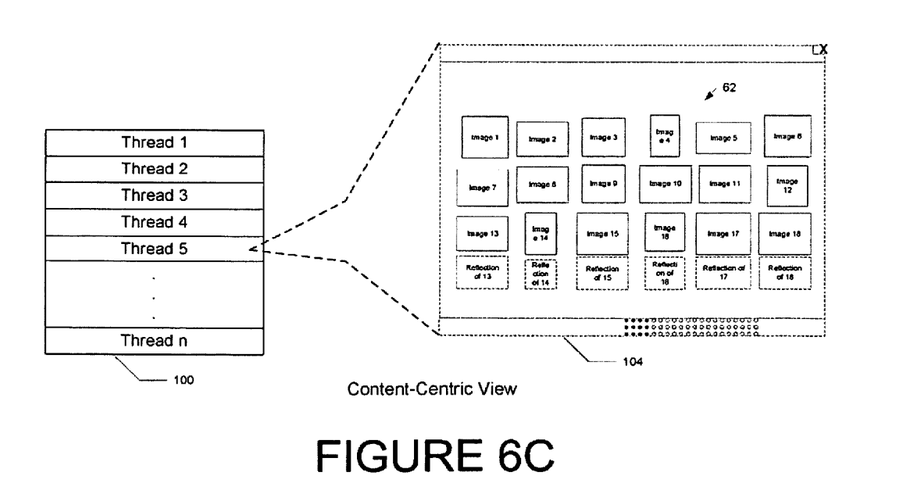

In FIG. 6A, a list 100 of threads is presented within the player window (not shown) and a selected thread 102 is displayed within its own dialog box or window. This thread may include a number of individual messages, arranged chronologically or in another fashion according to the user's preferences. In FIG. 6B, the selected thread is displayed in-line within the context of the list of threads. In FIG. 6C, the selected thread is expanded into a content view 104, with the content from the thread displayed as a wall of content objects 62.

Notice that in the above-described example, one of the content servers 16A or 16B may host the internet service associated with the original content object and the other may host the user's social network service. Inherent in this discussion is the notion that the messaging server 17 is provided with any necessary credentials needed to access the user's social network service (e.g., a user name and password) and with any credentials needed to access the original content object (e.g., a different user name and password). Thus, it should be appreciated that a portion of the gateway 52 maintained by the messaging server 17 is a user account section in which users are permitted to store such credentials as part of a profile. In this way, the messaging server 17 can act on behalf of the user in negotiating access and content manipulations with content objects hosted by services that require user authentication.

The provision of a user account also allows for the federating of contact lists at messaging server 17. Recall that each user generally may keep a separate contact list associated with each internet service to which the user subscribes. In addition, the user may keep still another contact list associated with an email system used at work. It is likely the case that there exist many overlapping contacts between these lists, yet the various formats in which the lists are maintained by the different services and/or applications make it difficult to manage updates, additions and deletions from these various contact lists. Hence, it is not uncommon for these lists to be at least partially inconsistent with one another.

By making use of the present invention, all of the user's contact lists may be integrated or federated within a single contact list to be used in connection with messenger application 20. In connection with establishing an account at messaging server 17, the user may indicate the various internet services of which she/he is a member and provide access credentials for those services. In addition, the user may upload any contact lists which she/he maintains on her/his computer system 12. This may include, for example, a contact list associated with an email client.

Using the credentials provided, by the user, the messaging server contacts the different internet services, logs in as the user, and retrieves the different contact lists from the respective services. This is facilitated through the API appropriate to the service being contacted. Then, within aggregation layer 51, the different elements of each contact from each contact list are mapped to a common schema. For example, in some internet services, contact names may be organized as separate first names and last names while in other services they may be organized simply as names. Likewise, addresses at some services may be organized as separate street names and house numbers, while in other services they are organized simply as open alpha-numeric fields. The common schema defined by the aggregation layer 51 acts as a translation table by which the disparate fields of the different contact lists of the various internet services may be interrelated. Accordingly, the messenger client need only understand the name, address and other contact information syntax of the messaging server contact list (which may also be replicated in the communications layer 21 of each messenger application 20 for local use).

Initially, this assembly of contact lists will include multiple instances for one or more contacts. For example, in the case where a user has "Friend A" identified at internet service 1 (with an email address of, for example, friendA@internet_service_1), and the same "Friend A" identified at internet service 2 (with an email address of, for example, friendA@internet_service_2), there will be two instances of the user's friend A in the messaging application contact list. However, if the user's "Friend A" now opens an account and provides the messaging server 17 with his various credentials and contact information, the server will recognize that the same individual is associated with at least these two identity instances. Accordingly, in each user account in which "Friend A" is identified, the various instances of Friend A may be merged into a single instance. In this way, Friend A's various internet service identities become federated and will appear as a single instance in the original user's contact list.

Of course, the fact that the identities have been federated in this fashion does not mean that Friend A is reduced to a single identity. It is recognized that these different identities should be preserved so that the original user can communicate with Friend A using a channel appropriate to the desired communication. For example, if one of the above email addresses was a work address and another a personal address, the user may wish to share different communications with Friend A over different ones of these addresses, according to the time of day, type of content included in the message, or any of a number of other criteria.

Thus, within the context of the federated identity for each contact, the user is able to select the contact address to be used for a particular communication. This may be done, for example, by providing the user with address options whenever the user initiates a communication to the identified contact. Alternatively, a set of user preferences may be consulted when sending a message. For example, the preferences may specify rules to follow when sending communications (e.g., always use a particular contact's work address when sending messages between certain designated hours, otherwise use a personal address, or always use a contact's personal email address when including references to image objects as part of a message, etc.). Virtually any heuristics for messaging could be accommodated in this fashion.

Contacts are also federated in the sense that users can now freely share content with friends across multiple separate internet services. For example, messages that include content object references for content hosted at one internet service may be provided to contacts that do not have accounts at that service because the aggregation layer 51 of messaging server 17 can translate the content reference into a format recognized by the target internet service of the contact. This way, important content identifiers are not dropped and metadata may be preserved.

Above it was mentioned that the client messenger applications 20 may also store instances of the intermediate schemas and contact lists. This allows the client applications to interact directly with the target content sites and also permits local messaging without having to rely on an intermediate messaging server. In order to preserve confidentiality and security, the client applications may be encrypted on the local computer system 12. Only by receiving a valid session key from the messaging server 17 may access to the local instance of the messenger application 20 be permitted. These session keys may be provided upon successful authentication to the messaging server. Thereafter, if a user disconnects from the messaging server without logging out, he/she will be permitted to continue use of the local instance of his/her account. However, upon logging out such use will no longer be permitted. A different session key may be used to digitally sign communications between the messenger application 20 and the messaging server 17 in order to ensure that such communications are authorized.

Within the common schema provided by aggregation layer 51, user accounts, identities, contact lists, calendars, address books, etc. from disparate internet services 30, 40 are merged, rendering them collectively accessible from within the environment of the messenger application 20. Thus, multiple identities associated with multiple internet services are consolidated into a single identity. A user with a unique identity (including some or all of an email address, screen name, profile, login password, etc.) for each of his/her internet services may link all such identities to a single identity within the common environment provided by the present invention. In some cases, this may permit the messenger application 20 to effect multiple log-ins to all of a user's internet service accounts.

As discussed briefly above, sharing content from a particular internet service with a user may present access issues. The receiving user may not be a member of the sending user's internet service where the content resides, or the content may be a photo from a private album, etc. In such cases, the present invention may enable the sending user to conveniently share the content with the receiving user by bundling sufficient information for accessing the content along with the reference to the content. For example, the messenger application 20 may embed sufficient credentials into the content object reference for the sending user to access the content. Then, the sending user may infer or implicitly grant access to the receiving user by the mere act of sending the message. In an alternative embodiment of the invention, an option may be exposed to the sending user, upon such access issues arising, in order for the sending user to make an explicit decision of whether to grant the receiving user access to the content. The sending user may also decide whether to grant access to only the specific content or to the entire library or album (or other data container) which contains the content.

Another aspect of the invention is the preservation and display of metadata associated with content object when those content objects are shared between users and/or across internet services. For example, in addition to an image, contextual information concerning the image may also be displayed in connection therewith. Upon selection to highlight a particular image, information concerning that image may be presented in a frame surrounding the highlighted image or at other portions of the player window (e.g., in a crawl at or near the bottom of the screen, in another window that opens in proximity to the selected image, in a portion of the player window reserved for the display of such information, etc.). This information may include such items as the name or title of the image, its author or publisher, the originating site for the image, and comments by others concerning the image. The comments may be taken from the hosting internet service site or from a history of other player users (e.g., as recorded at the ad server or another server). The user may also be provided with a text box in which he/she can record and post his/her own comments concerning the subject image.

Metadata of content is preserved across disparate internet services and between sending and receiving users by mapping the metadata from each internet service onto the common schema provided by aggregation layer 51. There, metadata is redefined in a uniform format which will allow sharing of the metadata along with the content. This enables a user to send not only references to content objects, but also to wrap the context of the content objects around the transmitted reference, so that the content may be presented to the recipient coherently within the context of a conversation.

For example, a user may be conversing with another user on a particular subject via the messaging application 20, and may wish to send a particular photo of an event relevant to the subject. A simple drag and drop operation will result in not only the image being communicated to the recipient, but also any associated metadata as well. This spares the sender the extra task of explicitly explaining the details of the image and its contextual relevance to the conversation.

Further embodiments of the present invention implement a unified push model for communications between the messaging server 17 and individual instances of the messenger applications 20 on computer systems 12A and 12B. In effect, messaging server 17 acts as an aggregation point for feeds from internet services 30, 40, etc. The aggregation layer 51 is essentially a centralized hub for communications from the multiple internet services. By maintaining all of a user's individual account credentials for different internet services, the user can effect a single sign-on for each service by logging in to the messaging server 17. For example, the user may log-in to his/her account at messaging server 17, and the messaging server may then automatically log in to the user's individual accounts at various internet services (or these sessions may always be active). The messaging server 17 can then gather any updates or other messages for the user from these various services and channel all such messages through a single communication to the messaging application 20. In this fashion, a user may monitor news, activity, updates, etc. from a multiplicity of such services.

Instead of the messenger application constantly polling each of the internet services for updates, the centralized communication facilitated by the present invention will allow the messaging server to push content (and effectively wake up the messenger application) to the user when the content is available. In some instances, this push service may operate even when the messenger application is not active on the user's computer and the user may be notified of available content updates via an out-of-band channel such as an email or other communication. In still other embodiments, notification may be provided through pop-up or other attention grabbing means on a user's desktop. The messenger application may make note of a user's tendencies, and begin to prioritize incoming notifications based on which internet service notification a user tends to respond to most often. For example, a user may immediately view notifications from an email service more often than notifications from an online community service. In such case, notifications from the email service will have priority in arrival over notifications from the online community service.

As alluded to above, the messenger application 20 may, in some instances, support off-line capabilities for some or all of the internet services with which the user interacts. For example, local copies of contact lists, messages, content, etc., may be cached at a computer system 12 and made accessible via the messenger application 20, even when no communication channel to messaging server 17 (or other internet host) is available. A user may also be able to perform actions offline which are then queued and will take effect as soon as an internet connection becomes available and a user logs in onto his/her account.

For example, the messenger application 20 may permit access to locally cached images, messages, and contact lists, allowing a user to draft a message or organize a photo album offline. Then, when an internet connection becomes available, these changes may be uploaded to the messaging server and the changes that were effected in the context of the user's locally cached environment will be replicated at the user's account at the messaging server 17. This may include sending messages to other users, organizing content at other internet services, passing content references among disparate content services, etc.

Certain functions and features are unique to specific internet services. For example, some chat services may feature video conferencing capabilities, while others may not. Certain online communities may have automated buttons for expressing a user's particular mood. Certain photo album services may allow users to insert comic book style captions in photos. In the present invention, the messenger application is capable of incorporating interface controls and capabilities for such specific features. Therefore it is possible to have various internet service-specific versions of the messenger application, each with a different interface layer 22. On the other hand, more essential and common functions may be integrated into a generic version of the messenger application for use with all internet services.

Yet a further feature of the present invention is the inclusion of searching capabilities in the messenger application. A user may perform search queries for information and content in particular email folders, contact lists, conversation threads, and even globally across all internet services to which the user subscribes. Various broad or narrow search constraints may be configured. For example, a user may enter a search string that includes the name of a friend within all photo albums across certain or all online communities, or the user may search for a word within an inbox of an email service.

Initial use of the messaging application will serve as a "discovery stage" where the messenger application will ascertain a user's tendencies and interests in particular content and information. In this "discovery mode", the user may begin by performing a particular search for content, but as he/she begins interacting with that content in the messenger dialog boxes and/or in the content player, the messaging server 17, may refine and re-rank search results being presented to reflect the user's present interests (as evidenced by the user's interaction with the content being displayed) and/or historical interests of the current user and/or other users that have viewed similar content.

As should be apparent from the foregoing materials, the invention provides, in various embodiments, a communications system in which any number of communication portals (e.g., personal computer systems, digital media devices, mobile phones, etc.), each having an instance of a messenger client installed thereon, are able to be served (at or about the same time) by a remote server (or servers), thereby permitting users utilizing said messenger clients installed on said portals to directly communicate with one another. In some instances, the communications are facilitated through a user interface that includes windows displayed within the messenger client, the windows representative of communication channels between the various users. The users may be identified by individual, registered email accounts stored on the remote server. In the event a recipient of a message is not presently logged in to his/her account at the remote server, the message may be stored at the server. The message may be passed from the server to the recipient's messenger client when the associated user logs in to his/her account.

The communications between users may encompass, but are not limited to, text, digital video, web-hosted content and other content. The users may communicate with one another (individually or collectively) using text-based messages (e.g., by providing text information within a window representing a communication channel), or using messages that include images or other forms of content (e.g., by manipulating content items to populate communication windows within the messenger client, thereby providing a link (e.g., a visual URL) to that content to recipients of the messages). The messenger client environment or a window therein may be closed through an appropriate cursor control event, such a a mouse click of an appropriate screen icon or button, or a keyboard event such as pressing a designated keyboard key (e.g., an <esc> key).

The messenger client may be a portion of a player configured to display digital content items, including but not limited to digital images and digital video, in a graphic, as opposed to textual, form. In one instance, the digital content items are displayed so as to resemble bricks in a wall-like representation of content items. Content items included in messages are displayable within the wall-like representation at a recipient's messenger client and, upon selection from within the wall-like representation may be displayed in a full-screen representation.

Recent correspondence between users connected through the communication channel within the messaging client may be displayed in an unalterable form within one of the windows that represent communication channels. The size of the window may be fixed, and therefore, recently added unalterable text may displace older such text out of the view of the user.

Thus, methods and systems for federating contact lists of a user to facilitate the sharing of content obtained from web-based sources in a fashion that allows a recipient to experience the content in a fashion similar to that in which the sender thereof experienced have been described. Great degrees of freedom in accessing, organizing, sharing, and experiencing content from disparate internet services are enabled by the present invention. A common environment is provided which federates multiple service accounts and eliminates incompatibilities between internet services.

What is claimed is:

1. A communications system, comprising a number of communication portals, each having a non-transitory machine-readable medium with an instance of a messenger client installed thereon, communicatively coupled to be served by a remote server thereby permitting users utilizing said messenger client instances installed on said media to directly communicate with one another, the communications being facilitated through a user interface that includes:
   channel windows displayed within a first messenger client instance installed on a first non-transitory machine-readable medium, the channel windows representative of communication channels between the various users; and
   a plurality of images displayed within the first messenger client instance;
   wherein the first messenger client instance receives user input that causes a first image from the plurality of images to be dragged from the plurality of images and dropped onto a first channel window associated with a second messenger client instance installed on a second non-transitory machine-readable medium, wherein upon said user input, the first messenger client instance automatically causes the remote server to send references to both the first image and the plurality of images to the second messenger client instance, and wherein the second messenger client instance fully downloads both the first image and the plurality of images and displays the first image and the plurality of images, and wherein the second messenger client instance does not display the plurality of images that was displayed within the first messenger client instance until the second messenger client instance has downloaded the first image and the plurality of images.

2. The system of claim 1, wherein the user interface further includes a list of discussion threads, and wherein each discussion thread stores copies of past communications between two users.

3. The system of claim 2, wherein a selected discussion thread is expanded into a content view that displays content from the selected discussion thread as a wall of content objects.

4. The system of claim 3, wherein the content view displays content from the selected discussion thread as a wall of content objects that is rotated about a vertical axis to provide a three-dimensional view of the wall.

5. The system of claim 1, wherein the user interface further includes a contact list entry of a recipient displayed within the first messenger client instance, wherein the contact list entry includes multiple identities representing the recipient, wherein the first messenger client instance receives user input that selects a first identity of the contact list entry and causes the first messenger client instance to display the first channel window, and wherein the first channel window enables communicating with the first identity of the recipient.

6. The system of claim 5, wherein the first messenger client instance receives user input that selects one or more additional identities of the contact list entry and causes the first messenger client instance to display one or more additional channel windows, and wherein the one or more additional channel windows enable communicating with the one or more additional identities of the recipient.

7. A computer program product stored on a non-transitory machine-readable medium for enabling a first messenger client instance to initiate direct communication with a second messenger client instance, wherein the first messenger client instance is installed on a first communication portal associated with a first user, wherein the second messenger client instance is installed on a second communication portal associated with a second user, and wherein a remote server is communicatively coupled to the first communication portal and to the second communication portal, the communication being facilitated through a user interface, the computer program product including instructions that, when loaded into memory, cause a processor to perform a method, the method comprising:

displaying a channel window within the first messenger client instance, the channel window representative of a communication channel between the first messenger client instance and the second messenger client instance;

displaying a plurality of images within the first messenger client instance;

receiving user input at the first messenger client instance that causes a first image from the plurality of images to be dragged from the plurality of images and dropped onto the channel window; and responsive to receiving the user input, the first messenger client instance automatically causing the remote server to send references to both the first image and the plurality of images to the second messenger client instance, the references enabling the second messenger client instance to fully download both the first image and the plurality of images, the second messenger client instance not displaying the plurality of images that was displayed within the first messenger client instance until the second messenger client instance has downloaded the first image and the plurality of images.

8. The computer program product of claim 7, wherein the method further comprises displaying a list of discussion threads within the first messenger client instance, wherein each discussion thread stores copies of past communications between two users.

9. The computer program product of claim 8, wherein the method further comprises:

receiving user input at the first messenger client instance that selects a discussion thread; and responsive to receiving the selection user input, the first messenger client instance expanding the selected discussion thread into a content view that displays content from the selected discussion thread as a wall of content objects.

10. The computer program product of claim 9, wherein the content view displays content from the selected discussion thread as a wall of content objects that is rotated about a vertical axis to provide a three-dimensional view of the wall.

11. The computer program product of claim 7, wherein the method further comprises:

displaying a contact list entry of a recipient within the first messenger client instance, wherein the contact list entry includes multiple identities representing the recipient;

receiving user input at the first messenger client instance that selects a first identity of the contact list entry; and responsive to receiving the user input that selects the first identity, the first messenger client instance displaying the first channel window, wherein the first channel window enables communicating with the first identity of the recipient.

12. The computer program product of claim 11, wherein the method further comprises:

receiving user input at the first messenger client instance that selects one or more additional identities of the contact list entry; and responsive to receiving the user input that selects the one or more additional identities, the first messenger client instance displaying one or more additional channel windows, wherein the one or more additional channel windows enable communicating with the one or more additional identities of the recipient.

13. A computer-implemented method for enabling a first messenger client instance to initiate direct communication with a second messenger client instance, wherein the first messenger client instance is installed on a first communication portal associated with a first user, wherein the second messenger client instance is installed on a second communication portal associated with a second user, and wherein a remote server is communicatively coupled to the first communication portal and to the second communication portal, the communication being facilitated through a user interface, the computer-implemented method executed by a processor, the method comprising:

displaying a channel window within the first messenger client instance, the channel window representative of a communication channel between the first messenger client instance and the second messenger client instance;

displaying a plurality of images within the first messenger client instance;

receiving user input at the first messenger client instance that causes a first image from the plurality of images to be dragged from the plurality of images and dropped onto the channel window; and responsive to receiving the user input, the first messenger client instance automatically causing the remote server to send references to both the first image and the plurality of images to the second messenger client instance, the references enabling the second messenger client instance to fully download both the first image and the plurality of images, the second messenger client instance not displaying the plurality of images that was displayed within the first messenger client instance until the second messenger client instance has downloaded the first image and the plurality of images.

14. The computer-implemented method of claim 13, wherein the method further comprises displaying a list of discussion threads within the first messenger client instance, wherein each discussion thread stores copies of past communications between two users.

15. The computer-implemented method of claim 14, wherein the method further comprises:
receiving user input at the first messenger client instance that selects a discussion thread; and
responsive to receiving the selection user input, the first messenger client instance expanding the selected discussion thread into a content view that displays content from the selected discussion thread as a wall of content objects.

16. The computer-implemented method of claim 15, wherein the content view displays content from the selected discussion thread as a wall of content objects that is rotated about a vertical axis to provide a three-dimensional view of the wall.

17. The computer-implemented method of claim 13, wherein the method further comprises:
displaying a contact list entry of a recipient within the first messenger client instance, wherein the contact list entry includes multiple identities representing the recipient;
receiving user input at the first messenger client instance that selects a first identity of the contact list entry; and
responsive to receiving the user input that selects the first identity, the first messenger client instance displaying the first channel window, wherein the first channel window enables communicating with the first identity of the recipient.

18. The computer-implemented method of claim 17, wherein the method further comprises:
receiving user input at the first messenger client instance that selects one or more additional identities of the contact list entry; and
responsive to receiving the user input that selects the one or more additional identities, the first messenger client instance displaying one or more additional channel windows, wherein the one or more additional channel windows enable communicating with the one or more additional identities of the recipient.

* * * * *